United States Patent Office 3,411,066
Patented Nov. 12, 1968

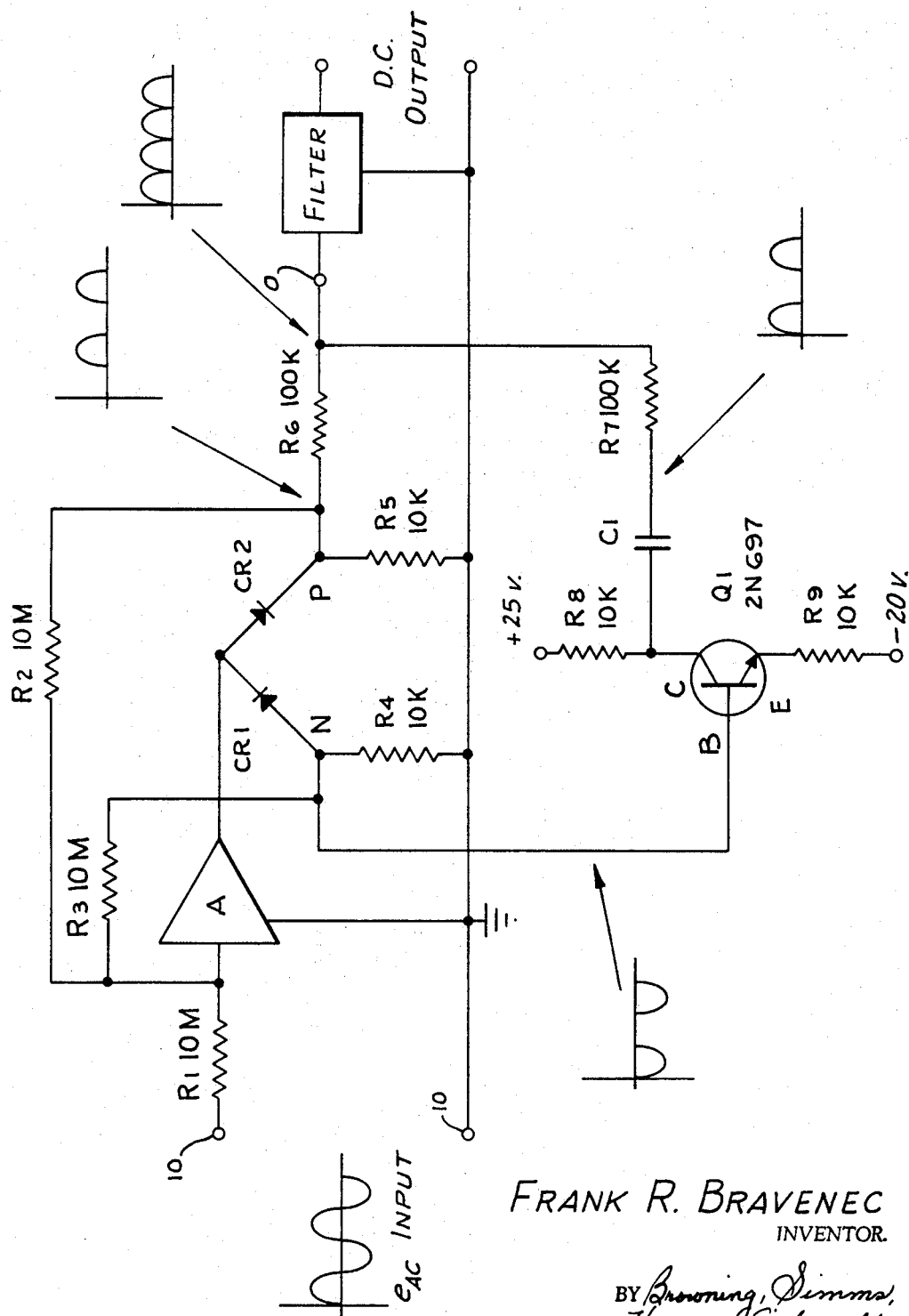

3,411,066
AC TO DC CONVERTER FOR AC VOLTAGE MEASUREMENT
Frank R. Bravenec, Houston, Tex., assignor, by mesne assignments, to Bausch & Lomb Incorporated, Rochester, N.Y., a corporation of New York
Filed Jan. 15, 1965, Ser. No. 425,843
8 Claims. (Cl. 321—8)

ABSTRACT OF THE DISCLOSURE

An AC to DC converter is disclosed which converts an AC signal whose voltage is to be determined to a measurable DC voltage. The AC signal is fed to an amplifier and from there to a pair of oppositely poled diodes connected in parallel to produce respectively positive and negative half wave rectified signal outputs. One of the outputs is inverted in a signal inverter circuit to produce a signal of the same magnitude and polarity as the other output. The inverted signal and said other output are then mixed in a mixing circuit to produce a full wave rectified output which may then be filtered and measured.

---

This invention relates to an improved and simplified apparatus for precise conversion of AC to DC signals and particularly to one which maintains accuracy at very low frequencies even though it is of greatly reduced complexity. In another aspect, it relates to such a converter having a single ended DC output with one lead common to the input, thus eliminating common mode signals and unnecessary power supplies.

The amplitude of an AC signal is commonly indicated by one or more of three values, peak, average, or RMS. Probably the most common method of assuming AC signals is the one in which the signal is rectified and the average value of the resulting signal is measured by a DC device which is calibrated with a correction factor included so as to indicate the RMS value of a sine wave. The DC measuring device may be a simple panel meter, yielding accuracies of about 1%, or a more complicated DC instrument, such as a digital voltmeter, which may provide accuracies of the order of 0.1% or better.

In order to measure AC signals with frequencies below a few hundred cycles per second, the AC to DC converter must provide a DC output signal relatively free from ripple or the DC measuring device may detect the ripple as a verying DC and thus indicate a correspondingly varying AC signal input into the converter. Too much filtering, on the other hand, introduces long time constants making the converter sluggish and effectively limiting the rate at which the input amplitude may change and yet be accurately measurable.

The design of an AC to DC converter, must, therefore, contain a compromise between the lowest frequency of input signal which can be measured, the speed of response, and the complexity of the filter which can be justified.

Furthermore, in many cases, it is highly desirable to have a converter with a single-ended DC output with one lead common to the input, thus eliminating common mode signals and unnecessary power supplies.

In the past, several different types of apparatus have been provided for converting the AC to DC. In each of them, the signal rectifying diodes are placed within a current feedback loop of a high loop gain, broad band amplifier, thus reducing the effect of diode characteristics. If the gain of the amplifier is sufficiently high, the output current and, thus, the rectified voltage across the load is very nearly proportional to the input AC signal.

In one such apparatus, a single rectifying diode is employed as the output diode and hence the output is half-wave with considerable ripple which must be filtered. In filtering, the objective is to obtain the least ripple for a given response time. The higher the ripple frequency, the higher the filter cut-off frequency can be made for a given response time and ripple output. In half-wave detection of the foregoing type, the lowest ripple frequency component is the same as the input signal whereas the lowest frequency component in full-wave detection is twice the fundamental 2:1 advantage in terms of frequency. In addition, a 2.35:1 advantage is obtained in ripple amplitude, giving approximately a 4.7:1 advantage of full-wave compared to half-wave rectification in what is required in extending the low frequency limit of a converter. Thus, a relatively complicated filter is required for half-wave rectification to obtain design objectives.

In another such apparatus, a dode bridge is used and, although a full-wave rectified signal output is obtained, the high gain amplifier which is used is above ground and thus the apparatus is subject to high common mode signals appearing between the output and the input and amplifier common. This limits the utility of the apparatus and also requires separate power supplies for the inverter and the readout voltmeter.

In order to overcome the disadvantages of the foregoing two types of apparatus, it has been proposed to apply the AC input signal to a phase inverter in order to obtain two AC signals 180° out of phase and proportional to the input These two signals are then applied to two identical converters in order to obtain simultaneously two positive half-wave outputs wihch are phase displaced by 180°. These two signals are then added together to obtain a full-wave single-ended output signal. Since the accuracy of average value calibrated RMS detection is very dependent upon signal wave shape, it is highly desirable to keep the number of active elements to a minimum to reduce distortion and nonlinearity. Since this type of apparatus contains a phase inverter, two amplifiers and two active rectifiers, it has more than doubled the number of active elements contained in the other two types of apparatus mentioned above. Moreover, not only must these amplifiers be very carefully constructed in order to have the requisite high gain and broad band width just as for the amplifiers of the other two types of apparatus discussed above, but they also must be carefully adjusted and tested in order to properly match their characteristics and this, of course, is very expensive and time consuming. Since the object is to obtain high conversion accuracy over a wide frequency range, the phase inverter and both amplifiers must have flat characteristics at both low and high frequencies. High loop gains are needed in both amplifiers for stability, good frequency response, and to obtain good linearity.

It is therefore an object of this invention to provide a single-ended converter which has the relative simplicity of the first or half-wave type of converter described above and yet which obtains the low frequency performance of the complicated and costly phase inverter-dual amplifier type of apparatus.

Another object is to provide a single-ended precise AC to DC converter operable over a broad range of frequencies and yet which uses only a single channel of broad band flat amplification and rectification.

Another object is to provide a precision AC to DC converter which would normally have a half-wave output, with a means for converting such half-wave output to a full-wave output so as to reduce ripple without affecting the DC output of the over-all converter.

Another object is to provide an apparatus in which the frequency response of a precision AC to DC half-wave rectifier is improved to that of a full-wave type of rectifier by a very simple circuit which can be added at a relatively low cost.

Other objects, advantages and features of the invention will be apparent to one skilled in the art upon considering the specification, claims and the drawing wherein FIG. 1 shows a preferred embodiment of the invention in schematic form.

Referring to the drawing, an input 10 is provided for the AC signal whose voltage is to be measured and it will be noted that this includes a ground which is common to the entire circuit. The AC input signal is applied to the input of an amplifier A through R1. The amplifier is of a type well known to those skilled in the art and can be one which is commonly used in precision AC voltmeters of the types described above. At any rate, it is preferred that it have flat characteristics at both low and high frequencies and to have a high loop gain for stability, good frequency response, and to obtain good linearity. A pair of oppositely poled diodes CR1 and CR2 are connected to the output of the amplifier and also a pair of resistors R4 and R5. Thus, the output of the amplifier is connected to R4 and R5 on alternate half cycles by the rectifiers producing half-wave negative and positive signals on R4 and R5 respectively. The signals across R4 and R5 are returned to the amplifier input through R2 and R3 providing negative feed-back around the amplifier and diodes. For the circuit values shown in the drawing, for example, the amplifier voltage gain is greater than ten thousand resulting in approximately unity gain between the input and outputs at points N and P.

It will thus be seen that the half-wave rectifier means comprising the two diodes produce separate positive and negative half-wave rectified signals respectively in phase with the positive and negative portions of the AC signal input thereto. Also, the outputs at points N and P will have a DC component. Thus, the output of CR2 at point P will have a DC component proportional to the input AC voltage and a ripple whose lowest ripple frequency component is the same as the input signal. It is this half-wave signal which will be converted to a full-wave signal by the means described below.

Thus, there is provided a signal inverting means coupled to the output of one of the half-wave diodes and producing an inverted signal output free from DC components but of the same polarity and magnitude as that of the half-wave signal output of the other diode. Then this inverted signal is mixed with the output of the other diode to produce a full-wave rectified signal output. In the embodiment shown, the signal inverter means includes an electron valve shown as transistor Q1 having its base coupled to the output of CR1 at point N. The AC signal at the collector C of Q1 can be made equal in amplitude to that of the base by proper choice of resistors R8 and R9 although exact equality is not essential.

As can be seen from the wave form shown, the AC signal at the collector C of transistor Q1 is a positive going half-wave signal of approximately the same amplitude as that at point P but, in effect, displaced exactly 180° with respect to the signal at point P. It will thus be seen that by adding these two half-wave signals, a full-wave signal having its lowest ripple frequency component equal to twice that of the AC input can be obtained. Thus, the signal from the inverter is coupled through R7 to output O where it is added to the signal from point P through R6 producing a signal at O which has an average value of voltage equal to that of point P and the sum of the AC voltages of points P and C, which is equivalent to a full-wave ripple component.

In order to remove the inverter from the DC path so that it does not affect the converter output, a capacitor C1 is connected in series with R7 to provide a means for blocking DC from the inverter output signal which is to be added to the signal from point P. C1 can be made as large as desired in order to improve low frequency response without adding an unwanted time constant to the output. This is accomplished by arranging the circuits so that when the DC voltage on one side of the capacitor increases, it will increase an equal amount on the other side so that there is no net charging or discharging of the capacitor as the input AC signal level is changed. One means of doing this is to bias the signal inverter circuit such that the DC component in its output changes in unison with the DC component in the output from CR2. Thus, for the arrangement shown in the drawing, if the AC input is zero, the outputs at N and P are zero and the collector of Q1 will be approximately +5 volts resulting in a net charge of +5 volts on C1. If the input signal is increased to two volts, the average DC value at points N and P will be approximately −1 and +1 volts respectively. With −1 volt on the base of Q1, the collector voltage will increase to approximately +6 volts with the average charge on C1 thus remaining at +5 volts.

The mixed output O can be fed to a conventional filter as shown and the filter output can be connected to a suitable DC voltage measuring device. Preferably this device has a very high impedance so as to not load the inverter output.

For the circuit shown in the drawing, R4 and R5 are equal so that the amplitudes of the two half-wave signals at points N and P are likewise equal. Further, Q1 has a gain of one so that its AC output has an amplitude equal to that at point P. To maintain accuracy it is important that the AC output of the signal inverter be equal to that at point P and as described above, this equality is maintained by making R4 equal R5 and the gain of Q1 equal to one. It is possible to make the signal at point N unequal to that at point P, such as by changing the relative values of R4 and R5 and then equalizing the two signals elsewhere in the circuit such as by changing the gain of Q1. However, this is not preferred.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention wtihout departing from the scope thereof, it is to be understood that all matter herein set forth or shown in the accompanying drawing is to be interpreted as illustrative and not in a limiting sense.

The invention having been described, what is claimed is:

1. In an apparatus for converting an AC signal whose voltage is to be determined to a measurable DC voltage wherein a pair of oppositely poled diodes are coupled by an amplifier to an input for the AC signal to respectively produce positive and negative half-wave rectified signal outputs, the combination therewith of signal inverting means coupled to the output of one diode and producing an inverted signal output free from DC components but of the same polarity and magnitude as that of the half-wave signal output of the other diode, and means for mixing said other diode output and said inverted signal output to produce a full wave rectified output.

2. In an apparatus for converting an AC signal whose voltage is to be determined to a measurable DC voltage wherein a pair of oppositely poled diodes are coupled by an amplifier to an input for the AC signal to respectively produce positive and negative half-wave rectified signal outputs, the combination therewith of signal inverter means including electron valve means coupled to the output of one diode and inverting the half-wave signal output thereof and producing an inverted signal output of the same polarity and magnitude as that of the half-wave signal output of the other diode, said electron valve means being biased so that its output has a DC voltage component changing in amounts equal to changes in the DC component in said other diode output; a mixing circuit coupled to said other diode output and inverter means output to mix such outputs to produce a full-wave rectified output; and a capacitance in the inverter means output preventing DC from such output being mixed with the other diode output and having substantially constant net charge due to the aforesaid DC components changing by equal amounts with changes of AC signal level.

3. In an apparatus for converting an AC signal whose voltage is to be determined to a measurable DC voltage wherein a pair of oppositely poled diodes are coupled by an amplifier to an input for the AC signal to respectively produce positive and negative half-wave rectified signal outputs, the combination therewith of signal inverting means controlled by one diode output signal to invert the same so as to produce an inverted output of the same polarity and magnitude as to the other diode output; an adding circuit coupled to said other diode output; a capacitor coupling said inverting means output to the adding circuit; said inverting means having a DC voltage component in its output and being biased so that such DC voltage component changes in amounts equal to changes in voltage of the DC component of said other diode output whereby any net charge on the capacitor remains substantially constant.

4. An apparatus for converting an AC signal whose voltage is to be determined to a measurable DC voltage comprising, in combination, an input for the AC signal; half-wave rectifier means coupled by an amplifier to said input for rectifying said AC signal to produce separate positive and negative half-wave rectified signals respectively in phase with the positive and negative portions of said AC signal; means coupled to said rectifier means for inverting one of said half-wave signals without phase shifting thereof and to produce an inverted output signal of the same magnitude as the other of said half-wave signals and including means blocking DC from said inverted output signal; and means for mixing said inverted signal and said other half-wave signal to produce a full-wave rectified signal.

5. The apparatus of claim 4 wherein said half-wave rectifier means includes a pair of oppositely poled diodes coupled to said input and respectively producing said positive and half-wave signals to be of the same amplitude and wherein said inverting means has a gain of one.

6. An apparatus for converting an AC signal whose voltage is to be determined to a measurable DC voltage, comprising, in combination, an input for the AC signal; a half-wave rectifier circuit coupled to the input by an amplifier and including a pair of oppositely poled diodes connected in parallel and to a source of common potential for the AC signal output from the amplifier and having outputs of positive and negative half-wave rectified signals respectively in phase with the positive and negative portions of said AC signal and also having DC components; a signal converter coupled to one of said outputs to be controlled by one of said output signals to invert the same without phase shifting and to produce an inverted output signal of the same magnitude as the other of said half-wave signals; a mixing circuit coupling said other diode output and said inverter output to produce a full-wave rectified signal; and a capacitor in said inverter output to block DC from said other diode output whereby preventing it adding to the DC component in said other output.

7. The apparatus of claim 6 wherein the diode output signals are of equal amplitude and the inverter circuit has a gain of one whereby the net charge of said capacitor remains substantially constant with changing AC input signal levels.

8. An apparatus for converting an AC signal whose voltage is to be determined to a measurable DC voltage comprising, in combination, an amplifier having an input for the AC signal; first and second oppositely poled diodes connected in parallel and to a source of common AC potential from the amplifier output and respectively having positive and negative half-wave rectified signal outputs of equal amplitude; a signal inverter circuit including an electron valve having a control element connected to the output of the second diode and having a gain of one, a resistance connecting the first diode output to a DC output, and a second resistance and capacitance in series connecting the inverter output to said DC output.

References Cited

UNITED STATES PATENTS 2,962,649  11/1960  Baum _____ 321—20
3,310,726  3/1967  James _____ 321—8

FOREIGN PATENTS 650,263  9/1937  Germany.

LEE T. HIX, *Primary Examiner.*

G. GOLDBERG, *Assistant Examiner.*